(12) United States Patent
Fukuyama et al.

(10) Patent No.: US 7,472,213 B2
(45) Date of Patent: *Dec. 30, 2008

(54) RESOURCE MANAGEMENT DEVICE

(75) Inventors: Toshihiro Fukuyama, Kadoma (JP);
Yuji Takai, Takatsuki (JP); Isao Kawamoto, Nishinomiya (JP);
Takahide Baba, Nishinomiya (JP);
Daisuke Murakami, Kyoto (JP);
Yoshiharu Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/979,121

(22) Filed: Oct. 31, 2007

(65) Prior Publication Data

US 2008/0065801 A1     Mar. 13, 2008

Related U.S. Application Data

(62) Division of application No. 11/057,521, filed on Feb. 15, 2005, now Pat. No. 7,350,004.

(30) Foreign Application Priority Data

Mar. 12, 2004   (JP) ............................. 2004-070391

(51) Int. Cl.
*G06F 12/00* (2006.01)
*G06F 13/14* (2006.01)
(52) U.S. Cl. ...................... 710/241; 710/244
(58) Field of Classification Search ................. 710/241, 710/244
See application file for complete search history.

(56) References Cited

U.S. PATENT DOCUMENTS 5,241,632 A    8/1993   O'Connell et al.
5,533,205 A    7/1996   Blackledge, Jr. et al.
5,845,097 A   12/1998   Kang et al.
5,948,089 A    9/1999   Wingard et al.
6,070,205 A    5/2000   Kato et al.
6,138,200 A   10/2000   Ogilvie
6,145,040 A   11/2000   LaBerge et al.
6,385,678 B2   5/2002   Jacobs et al.
6,401,176 B1   6/2002   Fadavi-Ardekani et al.
6,654,833 B1  11/2003   LaBerge
6,820,152 B2  11/2004   Kanzaki et al.
7,032,046 B2   4/2006   Horii et al.
7,404,024 B2 * 7/2008   Ries et al. ................... 710/244
2002/0023186 A1  2/2002  Kim
2002/0126660 A1  9/2002  Watanabe et al.
2004/0073730 A1  4/2004  Horii et al.
2004/0153591 A1  8/2004  Tanaka et al.

* cited by examiner

*Primary Examiner*—Khanh Dang
*Assistant Examiner*—Christopher A Daley
(74) *Attorney, Agent, or Firm*—McDermott Will & Emery LLP

(57) ABSTRACT

Bandwidth information including a plurality of slots each having highest priority order information for arbitrating access conflict, and priority master information for specifying, as a priority master, one or more of a plurality of masters whose latency in accessing a memory serving as a shared resource is desired to be reduced are included as arbitration information. When an arbitration section arbitrates access conflict while switching the slots in the bandwidth information at each of predetermined arbitration timings, if there is an access request from the priority master specified in the priority master information, the arbitration section changes the sequence of the slots in the bandwidth information so as to allow the priority master to access the memory with priority.

1 Claim, 10 Drawing Sheets

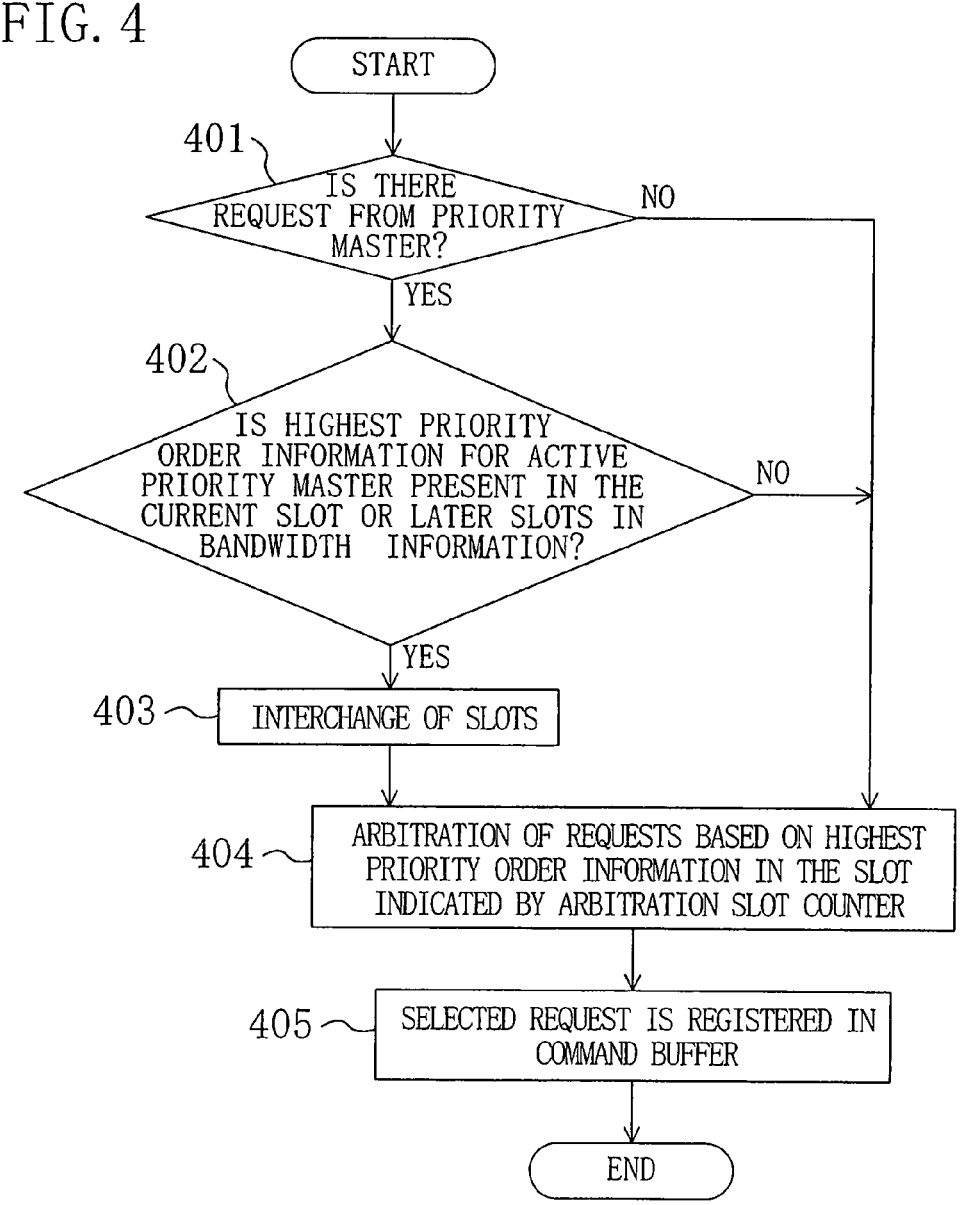

| SLOT | 0 | 1 | 2 | 3 | 4 | 5 | 6 | 7 |
|---|---|---|---|---|---|---|---|---|
| MASTER A | 1 | 0 | 0 | 0 | 1 | 0 | (0) | (0) |
| MASTER B | 0 | 0 | 1 | 0 | 0 | 0 | (1) | (0) |
| MASTER C | 0 | 1 | 0 | 1 | 0 | 1 | (0) | (1) |

| PRIORITY SLOT | P1 | P2 |
|---|---|---|
| MASTER A | 1 | 0 |
| MASTER B | 0 | 1 |
| MASTER C | 0 | 0 |

| SLOT | 0 | 1 | 2 | 3 | 4 | 5 | 6 | 7 |
|---|---|---|---|---|---|---|---|---|
| MASTER A | 1 | 1 | 0 | 0 | 0 | 1 | 0 | (0) |
| MASTER B | 0 | 0 | 0 | 1 | 0 | 0 | 0 | (1) |
| MASTER C | 0 | 0 | 1 | 0 | 1 | 0 | 1 | (0) |

FIG. 12
| SLOT | 0 | 1 | 2 | 3 | 4 | 5 | 6 | 7 |
|---|---|---|---|---|---|---|---|---|
| MASTER A | 0 | 0 | 0 | 0 | 0 | 0 | 0 | 0 |
| MASTER B | 1 | 0 | 1 | 0 | 1 | 0 | 1 | 0 |
| MASTER C | 0 | 1 | 0 | 1 | 0 | 1 | 0 | 1 |
FIG. 13
|  | SETTING | PRIORITY ORDER | ACCESS COUNTER INITIAL VALUE |
|---|---|---|---|
| MASTER A | 1 | 1 | 2 |
| MASTER B | 0 | - | 0 |
| MASTER C | 0 | - | 0 |
FIG. 16
|  | ACCESS COUNTER INITIAL VALUE |
|---|---|
| MASTER A | 2 |
| MASTER B | 4 |
| MASTER C | 2 |

RESOURCE MANAGEMENT DEVICE

CROSS-REFERENCE TO RELATED APPLICATION

This application is a Divisional of U.S. application Ser. No. 11/057,521, filed Feb. 15, 2005, now U.S. Pat. No. 7,350,004 claiming priority of Japanese Patent Application No. 2004-070391 filed on Mar. 12, 2004, the entire contents of each of which are hereby incorporated by reference.

BACKGROUND OF THE INVENTION

The present invention relates to a resource management device in a data processing system in which a plurality of masters access a shared resource.

In recent years, a small chip area, low power consumption, and capability of effective processing have become critical in a system LSI in which a plurality of masters, such as processors, DSPs (Digital Signal Processors), DMA (Direct Memory Access) controllers, etc., are connected to a resource, such as a memory, an input/output device, etc., by way of a plurality of buses. To that end, it is important to share the resource and realize effective access control.

In access control for enabling the resource sharing, the right to use the resource needs to be arbitrated in order to prevent a collision of access requests transmitted from the masters. Since the access conditions vary from master to master, the arbitration operation has to be performed flexibly so as to correspond to the access conditions of each master. Conventional access management devices which perform flexible arbitration are as follows.

A first conventional technique is a bus arbitration system for arbitrating accesses from a plurality of input/output devices to a single bus. In this system, a device having the highest priority is switched at a certain time interval, and when the highest priority device does not use the bus or for a period of time in which no highest priority device is specified, the arbitration operation is performed based on a fairly-allocated round-robin scheme or the like (see U.S. Pat. No. 5,533,205).

According to a second conventional technique, an access bandwidth is guaranteed in accesses from a plurality of masters to a shared resource by pre-allocating the access from each master (see U.S. Pat. No. 5,948,089).

A third conventional technique is a bus arbitration system for controlling accesses from a plurality of masters to a single bus. In this system, priority order is changed at every bus cycle, which is the unit cycle of bus operation, so that the right to use the bus only for the next single bus cycle unit is given (see U.S. Pat. No. 6,070,205).

In the first conventional technique, it is possible to set a time at which each device is assigned the highest priority for using the bus. However, in a case where a bus cycle in which the bus is used requires a plurality of clocks, the access, once it has started, does not stop even if the device having the highest priority is switched to another device, which inhibits access from the device that should be arbitrated with the highest priority.

In the second conventional technique, it is possible to allocate the bus for a suitable period of time in accordance with accesses made from the masters. Nevertheless, when an access request sent from each master is unpredictable, the allocation of the right to use the shared resource to each maser cannot be performed properly.

In the third conventional technique, it is possible to assign weights to the allocation of the bus-use right to the masters. However, when bus cycles with different transfer sizes are present together or when access time to the resource changes depending upon circumstances, a transfer size within a given time period and hence an access bandwidth cannot be guaranteed for each master, because each bus cycle has a different number of clocks.

SUMMARY OF THE INVENTION

It is therefore an object of the present invention to provide a resource management device capable of immediately granting an access right to an access request in real-time processing or the like which requires immediate access to a shared resource, while guaranteeing an access bandwidth.

In order to achieve the above object, a first inventive resource management device, which is a resource management device in a data processing system in which a plurality of masters access a shared resource, includes: an arbitration timing generation section for generating a timing at which access conflict occurring when the masters access the shared resource is arbitrated; arbitration information containing bandwidth information and priority master information, the bandwidth information including a plurality of slots each having highest priority order information for arbitrating the access conflict, the priority master information being used for specifying, as a priority master, one or more of the masters whose latency in accessing the shared resource is desired to be reduced; and an arbitration section for arbitrating the access conflict according to the arbitration information, wherein when the arbitration section arbitrates the access conflict while switching the slots in the bandwidth information at each arbitration timing generated by the arbitration timing generation section, if there is an access request from the priority master, the arbitration section changes the sequence of the slots in the bandwidth information so as to allow the priority master to access the shared resource with priority.

A second inventive resource management device, which is a resource management device in a data processing system in which a plurality of masters access a shared resource, includes: an arbitration timing generation section for generating a timing at which access conflict occurring when the masters access the shared resource is arbitrated; arbitration information containing bandwidth information, priority master information, and priority master bandwidth information, the bandwidth information including a plurality of slots each having highest priority order information for arbitrating the access conflict, the priority master information being used for specifying, as a priority master, one or more of the masters whose latency in accessing the shared resource is desired to be reduced, and the priority master bandwidth information being bandwidth information for reducing the latency of access from the priority master to the shared resource; and an arbitration section for arbitrating the access conflict according to the arbitration information, wherein when the arbitration section arbitrates the access conflict while switching the slots in the bandwidth information at each arbitration timing generated by the arbitration timing generation section, if there is an access request from the priority master, the arbitration section inserts the priority master bandwidth information into a corresponding one of the slots in the bandwidth information so as to allow the priority master to access the shared resource with priority.

A third inventive resource management device, which is a resource management device in a data processing system in which a plurality of masters access a shared resource, includes: an arbitration timing generation section for generating a timing at which access conflict occurring when the masters access the shared resource is arbitrated; arbitration information containing bandwidth information and priority master information, the bandwidth information including a plurality of slots each having highest priority order information for arbitrating the access conflict, the priority master information being used for specifying, as a priority master, one or more of the masters whose latency in accessing the shared resource is desired to be reduced; an access counter for limiting the number of accesses to be made by the priority master within a given period of time; and an arbitration section for arbitrating the access conflict according to the arbitration information, wherein when the arbitration section arbitrates the access conflict while switching the slots in the bandwidth information at each arbitration timing generated by the arbitration timing generation section, if there is an access request from the priority master, the arbitration section allows the priority master to access the shared resource with priority, while limiting, by using the access counter, the number of accesses made by the priority master.

A fourth inventive resource management device, which is a resource management device in a data processing system in which a plurality of masters access a shared resource, includes: an arbitration timing generation section for generating a timing at which access conflict occurring when the masters access the shared resource is arbitrated; arbitration information containing bandwidth information for specifying the number of accesses to be made by each of the masters for a given period of time, each specified number of accesses being used for arbitrating the access conflict; an access counter for limiting the number of accesses from each master within the given period of time; and an arbitration section for arbitrating the access conflict according to the arbitration information, wherein at each arbitration timing generated by the arbitration timing generation section, if there is an access request from any one of the masters, the arbitration section allows the master that has issued the access request to access the shared resource, while limiting, by using the access counter, the number of accesses from each master.

According to the present invention, in a resource management device in a data processing system in which a plurality of masters access a shared resource, it is possible to reduce access latency in real time, while ensuring an access bandwidth for each master. Accordingly, it becomes possible to ensure real-time performance of applications operating on the system.

BRIEF DESCRIPTION OF THE DRAWINGS

FIG. 3 illustrates an example of priority master information shown in FIG. 1.

FIG. 4 is a flow chart indicating how an arbitration section shown in FIG. 1 operates.

FIG. 7 illustrates an example of bandwidth information shown in FIG. 6.

FIG. 8 illustrates an example of priority master bandwidth information shown in FIG. 6.

FIG. 13 indicates an example of priority master information shown in FIG. 11.

FIG. 16 indicates an example of bandwidth information shown in FIG. 15.

DESCRIPTION OF THE PREFERRED EMBODIMENTS

Hereinafter, first through fourth embodiments of the present invention will be described with reference to the accompanying drawings.

First Embodiment

Figures 1, 2:
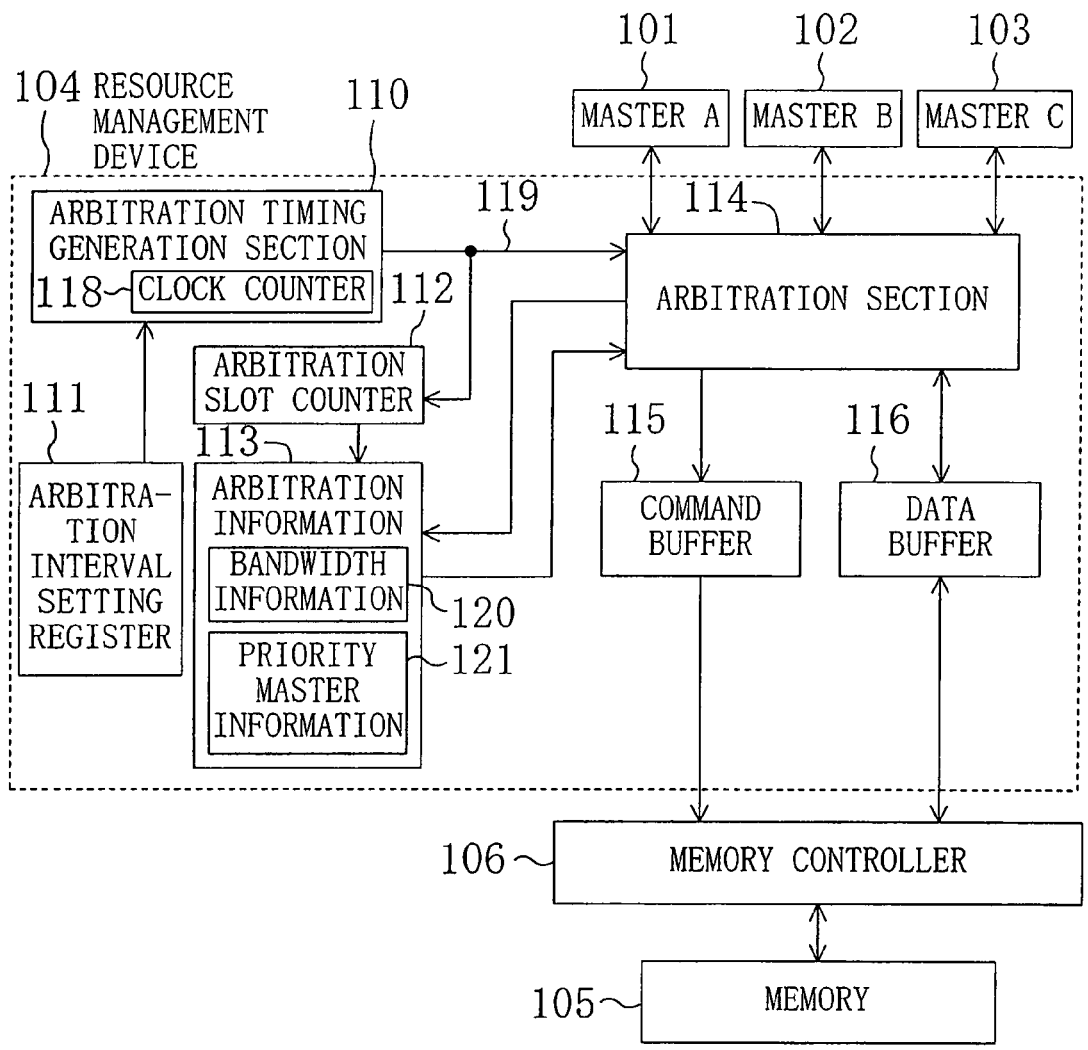
FIG. 1 is a block diagram schematically illustrating the configuration of a data processing system which includes a resource management device according to a first embodiment of the present invention.
FIG. 2 illustrates an example of bandwidth information shown in FIG. 1.

FIG. 1 schematically illustrates the configuration of a data processing system which includes a resource management device 104 according to a first embodiment of the present invention. In FIG. 1, the reference numerals 101, 102 and 103 denote masters, each connected to the resource management device 104 via respective buses. The resource management device 104 arbitrates access requests from the masters 101, 102, and 103 to a memory 105 serving as a shared resource, and then transmits the selected request to a memory controller 106 connected to the memory 105. The memory controller 106 interprets the transmitted access request, generates a signal complying with the memory protocol, and reads or writes data in the memory 105. In the following descriptions, the masters 101, 102, and 103 will also be referred to as "masters A, B, and C", respectively.

In the resource management device 104 of FIG. 1, the reference numeral 110 refers to an arbitration timing generation section; 111 to an arbitration interval setting register; 112 to an arbitration slot counter; 113 to arbitration information, which contains bandwidth information 120 and priority master information 121; 114 to an arbitration section; 115 to a command buffer; and 116 to a data buffer. The arbitration timing generation section 110 includes a clock counter 118. Upon detection of a clock input, the arbitration timing generation section 110 adds one to the clock counter 118 and compares the value of the clock counter 118 with the value of the arbitration interval setting register 111. If these values are equal to each other, the arbitration timing generation section 110 sets an arbitration timing signal 119 and resets the clock counter 118. If these values are not equal to each other, the arbitration timing generation section 110 resets the arbitration timing signal 119.

FIG. 2 indicates an example of the bandwidth information 120 shown in FIG. 1. The leftmost column (i.e., the first column) represents the fixed priority order established among the masers A, B, and C, where a master of an upper row has a higher priority. The other columns (i.e., the second through ninth columns) each show information on the highest priority order among the masters A, B and C, where the master marked with "1" has the highest priority, and the highest priority order takes precedence over the fixed priority order mentioned above. The second through ninth columns are each called a slot and each slot is assigned a slot number as shown in the top row. The arbitration slot counter 112 is used to select, among the plurality of slots in the bandwidth information 120, a slot to be used in the next arbitration operation. Each time the arbitration timing signal 119 is set, the arbitration slot counter 112 is incremented by one, and when the arbitration slot counter 112 has reached a predetermined maximum value (a value of 8 in this example), the arbitration slot counter 112 is reset to 0. In other words, the slots 0 through 7 form one cycle.

FIG. 3 indicates an example of the priority master information 121 shown in FIG. 1. The priority master information 121 establishes settings for priority masters whose latency in accessing the memory 105, i.e., the shared resource, is desired to be reduced. In FIG. 3, in the column under the heading "setting", settings for the priority maters are marked as "1", and the masters A and C are set as the priority masters. In the column under the heading "priority order", the priority order among the priority masters is shown.

FIG. 4 indicates how the arbitration section 114 shown in FIG. 1 operates. When the arbitration timing signal 119 has been set, the arbitration section 114 determines whether there is an access request from a master that has been designated as a priority master in the priority master information 121, in accordance with the priority order among the priority masters (Step 401). Herein, a priority master which has issued an access request is referred to as an "active priority master". If there is a request from the priority master, it is determined whether the highest priority order information for that active priority master is present in the bandwidth information 120 in the current slot that the arbitration slot counter 112 indicates or later slots (Step 402). For example, assume a case in which the bandwidth information 120 and the priority master information 121 are established as shown in FIGS. 2 and 3, respectively, at the time when the arbitration slot counter 112 has a value of "2". In this case, if there is no access request from the master A and there is an access request from the master C, it is determined whether the highest priority order information for the master C has been established in any of the slots 2 through 7. In this case, the highest priority order information for the master C has been set in the slot 5.

If it is determined in Step 402 that there is the highest priority order information, the slots in the bandwidth information 120 are interchanged so that the access latency of the active priority master is reduced (Step 403). In the exemplary case described above, the slot 5 is inserted into the slot 2, the slot 4 is moved to the slot 5, the slot 3 is moved to the slot 4, and the slot 2 is moved to the slot 3. Then, the process proceeds from Step 403 to Step 404.

Figures 5, 6:
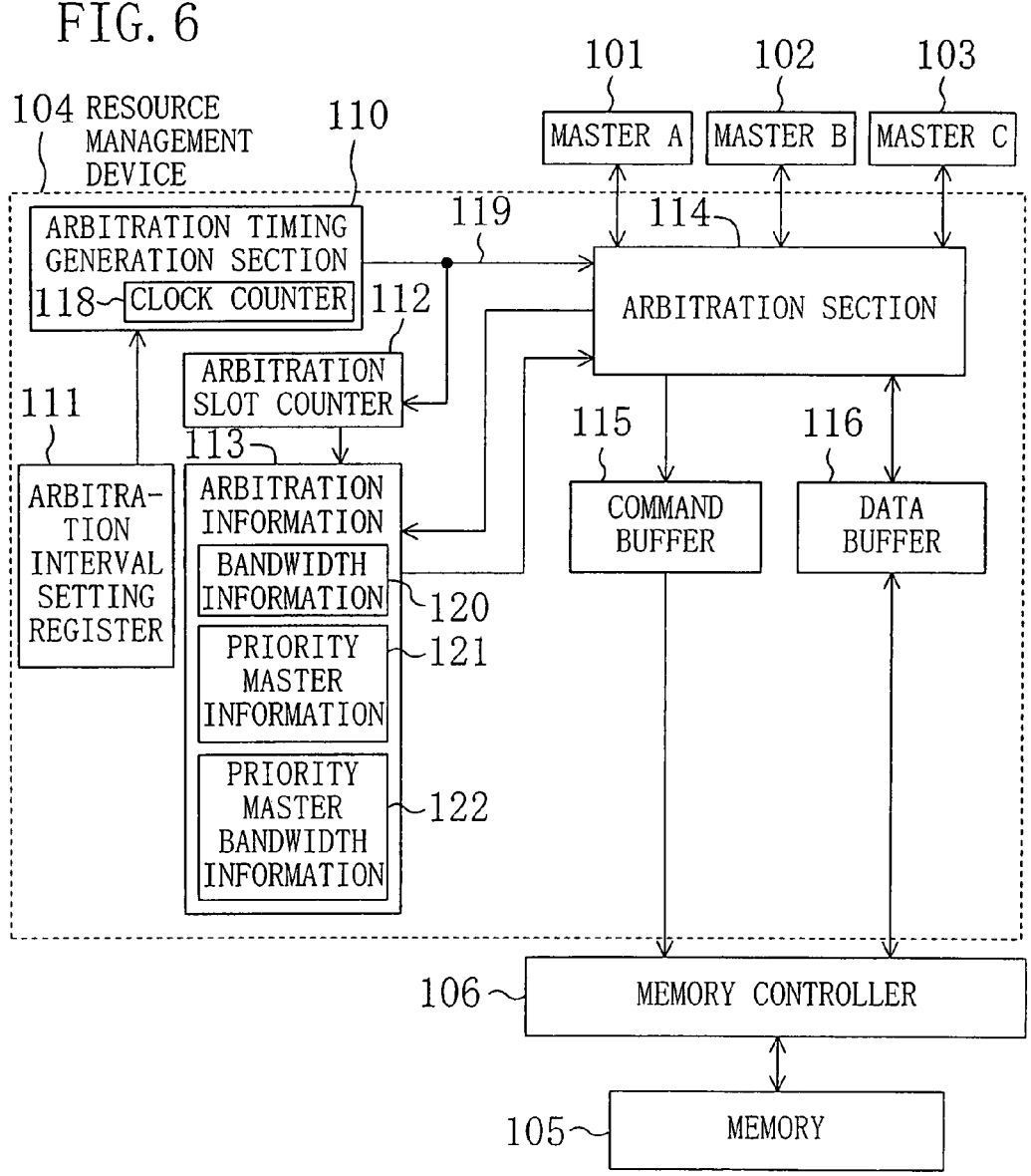
FIG. 5 indicates a state after the interchange of slots in the bandwidth information of FIG. 2 has been performed.
FIG. 6 is a block diagram schematically illustrating the configuration of a data processing system which includes a resource management device according to a second embodiment of the present invention.

FIG. 5 indicates the state of the bandwidth information 120 after the interchange of the slots in the bandwidth information 120 of FIG. 2. In FIG. 5, the master C is assigned the highest priority consecutively in the slots 1 and 2, which enables a continuous data transfer.

On the other hand, when there is no request from the priority master in Step 401 or when there is no highest priority order information for the active priority master in Step 402, the process proceeds to Step 404.

Next, the arbitration section 114 reads, from the bandwidth information 120, the highest priority order information in the slot that the arbitration slot counter 112 indicates, and arbitrates the access requests from the masters A, B and C in accordance with this information (Step 404). Lastly, the request selected in this arbitration operation is registered as an access command in the command buffer 115 (Step 405).

In the case of a continuous transfer in which the size of an access request to the memory 105 is more than four words, the request is divided to be transferred by four words, so that the data transfer to be arbitrated in one slot is limited to four words. Therefore, when a master has issued a continuous transfer request, the selection of four-word transfer is guaranteed in the slot in which the master is set to have the highest priority, such that an access bandwidth for access to the memory 105 is ensured for that master by the setting of the highest priority order information in the bandwidth information 120 and the setting of the arbitration intervals in the register 111.

The access command that the arbitration section 114 has registered in the command buffer 115 is read by the memory controller 106. The use of the command buffer 115 in this manner allows the transfer of the access command, even if the arbitration section 114 and the memory controller 106 have different driving clock frequencies.

In the case of a write access, data transmitted from the selected master is stored in the data buffer 116, and the data stored in the data buffer 116 is read and sent by the memory controller 106 to the memory 105. In the case of a read access, data read from the memory 105 by the memory controller 106 is stored in the data buffer 116 and the data stored in the data buffer 116 is read by the selected master. Using the data buffer 116 in this manner enables the data to be transferred, even if the masters 101 through 103 and the memory controller 106 have different driving clock frequencies.

In this embodiment, the slots in the bandwidth information 120 are interchanged for an access request issued by a master which requires real-time processing and whose latency in accessing the memory 105, i.e., the shared resource, is desired to be reduced, whereby the latency in accessing the memory 105 is reduced in real time. Furthermore, it is possible to guarantee, by the setting of the bandwidth information 120, the number of timings of arbitration operations in which the respective masters 101 through 103 have the highest priority for a given period of time, whereby an access bandwidth is ensured for a master which makes continuous access.

In cases where a plurality of active priority masters are present at the same time, arbitration may be performed according to the priority order among the masters A, B and C (see FIG. 3).

It should be noted that the method for interchanging the slots is not limited to that described in this embodiment, but may alternatively be a method in which the value of the arbitration slot counter 112 is changed temporarily, for example.

Furthermore, in order to avoid a situation in which only a priority master is selected continuously in arbitration, it is possible to impose restrictions, e.g., for preventing a priority master that has been selected a predetermined number of times from being selected in the ensuing arbitration operation.

Second Embodiment

FIG. 6 schematically illustrates the configuration of a data processing system which includes a resource management device 104 according to a second embodiment of the present invention. The difference from FIG. 1 is that arbitration information 113 further includes priority master bandwidth information 122.

FIG. 7 indicates an example of bandwidth information 120 shown in FIG. 6, while FIG. 8 indicates an example of the priority master bandwidth information 122 of FIG. 6. It is assumed that priority master information 121 is the same as the example of FIG. 3. Slots 6 and 7 in FIG. 7 are used in cases where there are no access requests from priority masters. The priority master bandwidth information 122 of FIG. 8 is bandwidth information used for reducing the latency of access by priority masters to a memory 105, i.e., a shared resource. In the examples shown in FIGS. 7 and 8, a bandwidth is guaranteed for slots 0 to 5 in the bandwidth information 120 and for priority slots P1 and P2 in the priority master bandwidth information 122.

Figure 9:
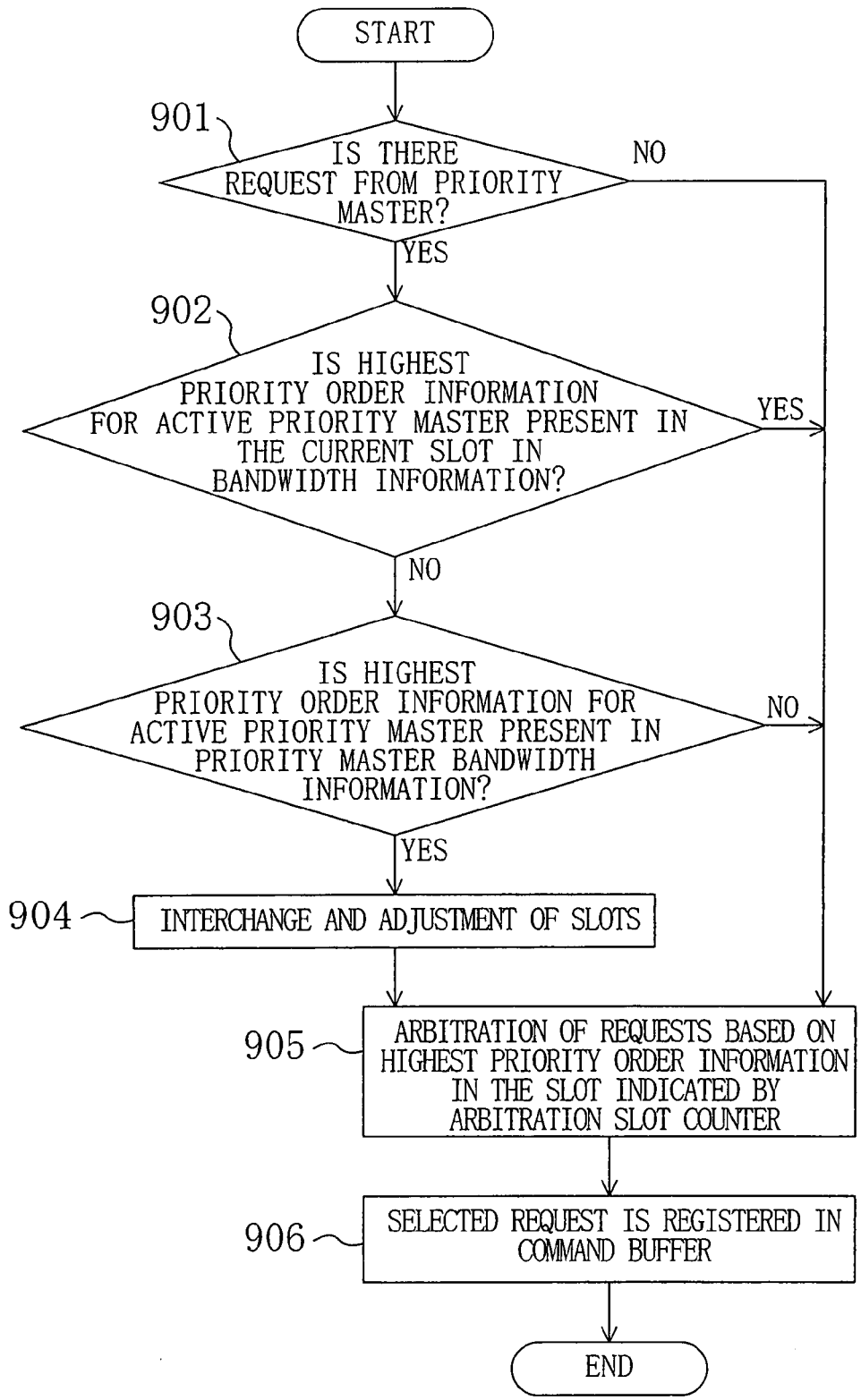
FIG. 9 is a flow chart indicating how an arbitration section shown in FIG. 6 operates.

FIG. 9 indicates how an arbitration section 114 shown in FIG. 6 operates. When an arbitration timing signal 119 has been set, the arbitration section 114 determines whether there is an access request from a priority master, according to the priority order among the priority masters (Step 901). If there is a request from the priority master, the arbitration section 114 determines whether highest priority order information for that active priority master is present in the current slot in the bandwidth information 120 that an arbitration slot counter 112 indicates (Step 902). For example, in a case where the active priority master is the master A and the arbitration slot counter 112 indicates "1", the determination in Step 902 will be "No", because the highest priority order information in the slot 1 indicates the master C.

If the highest priority order information for the active priority master is not present in the bandwidth information 120, it is determined whether highest priority order information for the active priority master is present in the priority master bandwidth information 122 (Step 903). For instance, when the active priority master is the master A, the determination in Step 903 will be "Yes", because the priority master bandwidth information 122 has the highest priority order information for the master A in the priority slot P1.

When the highest priority order information for the active priority master is present in the priority master bandwidth information 122, the priority slot including that highest priority order information is taken out from the priority master bandwidth information 122 and inserted into the current slot in the bandwidth information 120 (Step 904). For example, when the active priority master is the master A and the arbitration slot counter 112 indicates "1", the priority slot P1 in the priority master bandwidth information 122 is inserted into the position of the slot 1 in the bandwidth information 120, the replaced slot 1 into the slot 2, the replaced slot 2 into the slot 3, and the replaced slot 3 into the slot 4. In this manner, each slot is shifted by one slot. Then, the process proceeds from Step 904 to Step 905.

Figures 10, 11:
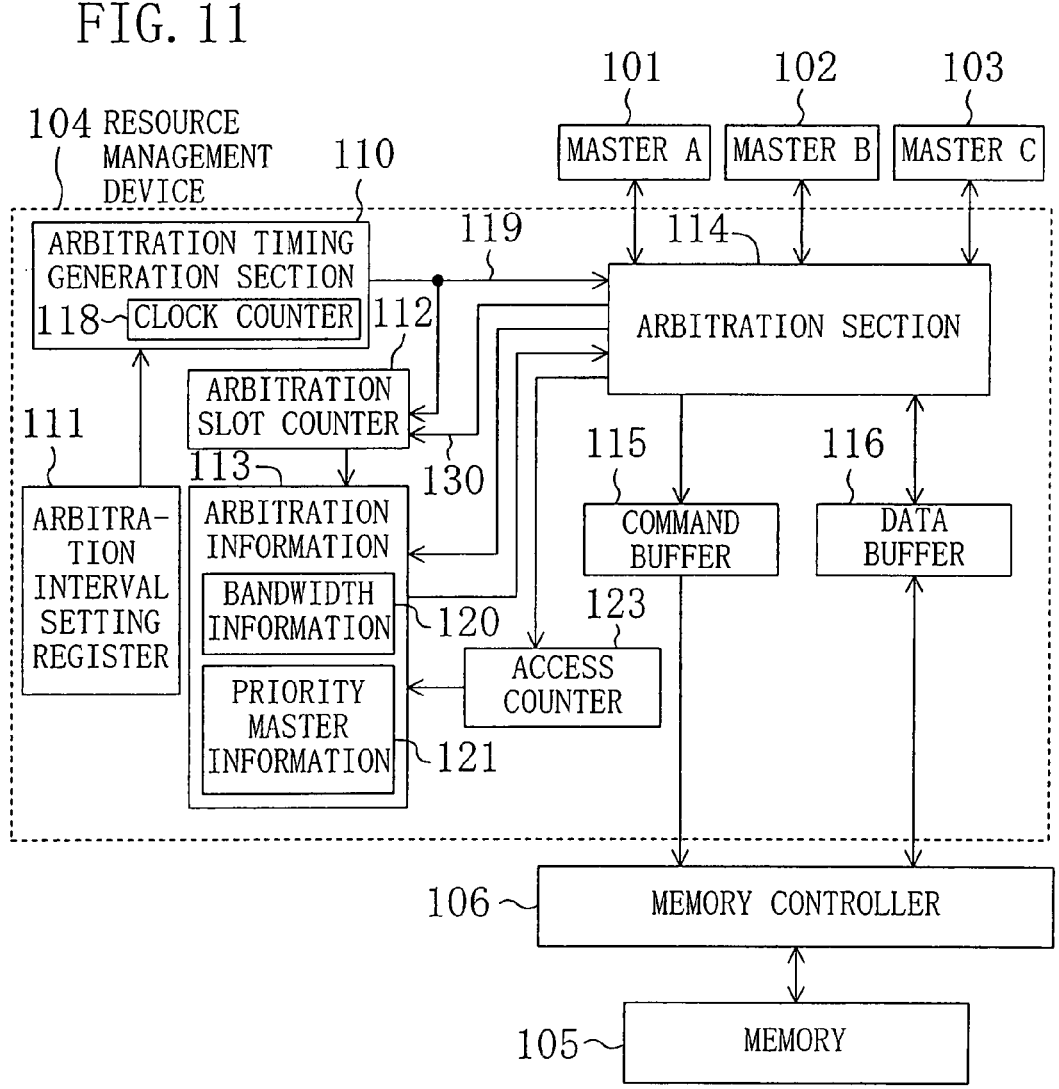
FIG. 10 indicates a state after the insertion and adjustment of slots in the bandwidth information of FIG. 7 have been performed.
FIG. 11 is a block diagram schematically illustrating the configuration of a data processing system which includes a resource management device according to a third embodiment of the present invention FIG. 12 indicates an example of bandwidth information shown in FIG. 11.

FIG. 10 indicates the state of the bandwidth information 120 after the insertion and adjustment of the slots in the bandwidth information 120 of FIG. 7. According to FIG. 10, the master A is assigned the highest priority continuously in the slots 0 and 1, which enables a continuous data transfer.

On the other hand, when there is no request from the priority master in Step 901, when the highest priority order information for the active priority master is present in the bandwidth information 120 in Step 902, or when there is no highest priority order information for the active priority master in the priority master bandwidth information 122 in Step 903, the process proceeds to Step 905.

Next, the arbitration section 114 reads, from the bandwidth information 120, the highest priority order information in the slot that the arbitration slot counter 112 indicates, and arbitrates the access requests issued from the masters A, B and C in accordance with this information (Step 905). Lastly, the request selected in this arbitration operation is registered in a command buffer 115 (Step 906).

When the arbitration slot counter 112 has reached a maximum value (a value of 8 in this example), the arbitration slot counter 112 is reset to 0, while the bandwidth information 120 and the priority master bandwidth information 122 are restored to their respective original states.

In this embodiment, the bandwidth information 120 is dynamically adjusted by using the priority master bandwidth information 122, for an access request issued by a master whose latency in accessing the memory 105, i.e., the shared resource, is desired to be reduced, which allows the latency of access to the memory 105 to be reduced in real time. Furthermore, it is possible to guarantee, by the setting of the bandwidth information 120, the number of timings of arbitration operations in which the respective masters 101 through 103 have the highest priority for a given period of time, whereby an access bandwidth is ensured for a master which makes continuous access.

In cases where a plurality of active priority masters are present at the same time, arbitration may be performed according to the priority order among the masters A, B and C (see FIG. 3). In any priority slot in the priority master bandwidth information 122, a plurality of highest priorities may be established.

In order to avoid a situation in which only a priority master is selected consecutively in arbitration, it is possible to impose restrictions, e.g., for preventing a priority master that has been selected a predetermined number of times from being selected in the ensuing arbitration operation.

Third Embodiment

FIG. 11 schematically illustrates the configuration of a data processing system which includes a resource management device 104 according to a third embodiment of the present invention. The difference from FIG. 1 is that the resource management device 104 further includes an access counter 123 for limiting the number of accesses to be made by priority masters within a given period of time. Also, an arbitration slot counter 112 of FIG. 11 is designed so as to receive an update inhibit signal 130 from an arbitration section 114.

FIG. 12 indicates an example of bandwidth information 120 shown in FIG. 11, while FIG. 13 indicates an example of priority master information 121 of FIG. 11. In the bandwidth information 120 of FIG. 12, highest priority order information for a master A is set at "0" in all of the slots. The priority master information 121 of FIG. 13 contains not only settings for priority masters and priority order among the priority masters, but also the initial value of the access counter 123 for each priority master. In the example of FIG. 13, only the mater A is set as a priority master and the access counter initial value (i.e., a maximum number of accesses within one cycle) for the master A is set at 2.

When the arbitration slot counter 112 has reached a maximum value (8 in this example), the arbitration slot counter 112 is reset to 0, while the access counter initial value for a priority master within the priority master information 121 is established in the access counter 123. Each time access is granted, the access counter 123 is decremented by one, and after the count value thereof becomes 0, no access request from the corresponding priority master is selected within that cycle.

If the update inhibit signal 130 from the arbitration section 114 has been set in the arbitration slot counter 112, the increment of the arbitration slot counter 112 is stopped. Furthermore, the maximum value (an initial value of 8 in this example) of the arbitration slot counter 112 is decremented by one, and the update inhibit signal 130 is then reset.

Figure 14:
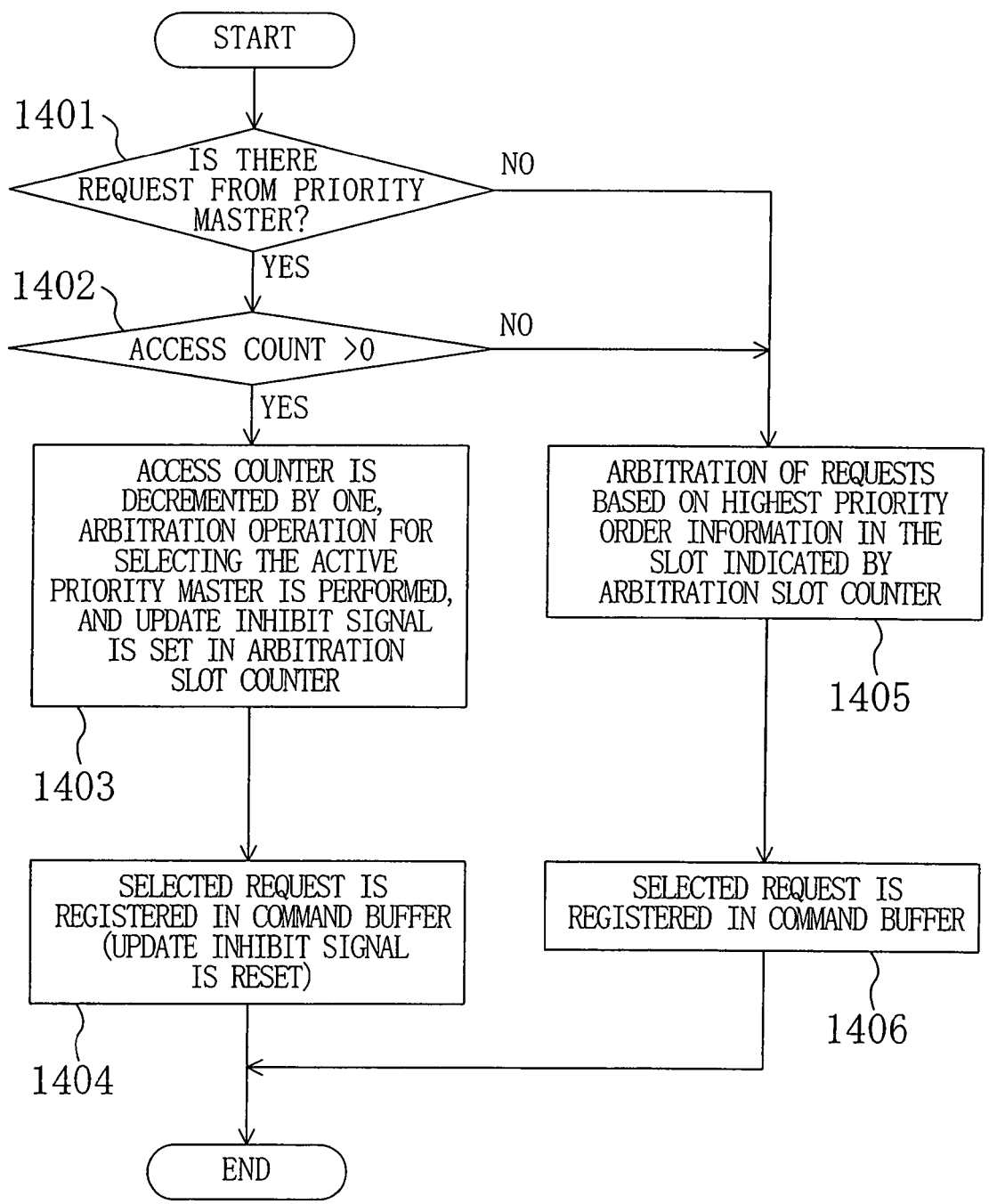
FIG. 14 is a flow chart indicating how an arbitration section shown in FIG. 11 operates.

FIG. 14 indicates how the arbitration section 114 shown in FIG. 11 operates. When an arbitration timing signal 119 has been set, the arbitration section 114 determines whether there is an access request from a priority master in accordance with the priority order among the priority masters (Step 1401). In the case of the exemplary setting of FIG. 13, it is determined whether there is a request from the master A. If there is a request from the priority master, it is determined whether the value of the access counter 123 for that active priority master is greater than 0 (Step 1402). If the value of the access counter 123 is greater than 0, the value of the access counter 123 for the active priority master is decremented by one, and an arbitration operation for selecting the active priority master is performed, while the update inhibit signal 130 is set in the arbitration slot counter 112 (Step 1403). Next, the request from the active priority master is registered in a command buffer 115 (Step 1404). At this point in time, the update inhibit signal 130 is reset.

If there is no request from the priority master in Step 1401 or when the value of the access counter 123 is 0 in Step 1402, the arbitration section 114 reads, from the bandwidth information 120, the highest priority order information in the slot that the arbitration slot counter 112 indicates, and arbitrates the access requests from the masters A, B and C in accordance with this information (Step 1405). Lastly, the request selected in this arbitration operation is registered in the command buffer 115 (Step 1406).

In the exemplary settings shown in FIGS. 12 and 13, if there are two requests from the master A, i.e., the priority master, in the slots 0 to 5, the arbitration slot counter 112 reaches the maximum value (the update value) at a value of 6, such that the remaining slots 6 and 7 are not used. If there is no access request from the master A serving as the priority master, the arbitration slot counter 112 reaches the maximum value (the initial value) at a value of 8, such that all of the slots 0 to 7 are used. Therefore, one cycle is always formed of eight slots, regardless of the presence or absence of an access request from the priority master.

In this embodiment, an arbitration operation is performed for an access request issued by a master whose latency in accessing the memory 105, i.e., the shared resource, is desired to be reduced, by using the bandwidth information 120, but with the access request from the priority master being considered as the request having the highest priority. Also, in this embodiment the access counter 123 for limiting the number of accesses to be made by the priority master within a given period of time is included. Accordingly, it is possible to reduce the latency of access to the memory 105 in real time. Furthermore, it is possible to guarantee, by the settings of the bandwidth information 120 and priority master information 121, the number of timings of arbitration operations in which the respective masters 101 through 103 have the highest priority for a given period of time, whereby an access bandwidth is ensured for a master which makes continuous access.

Fourth Embodiment

Figure 15:
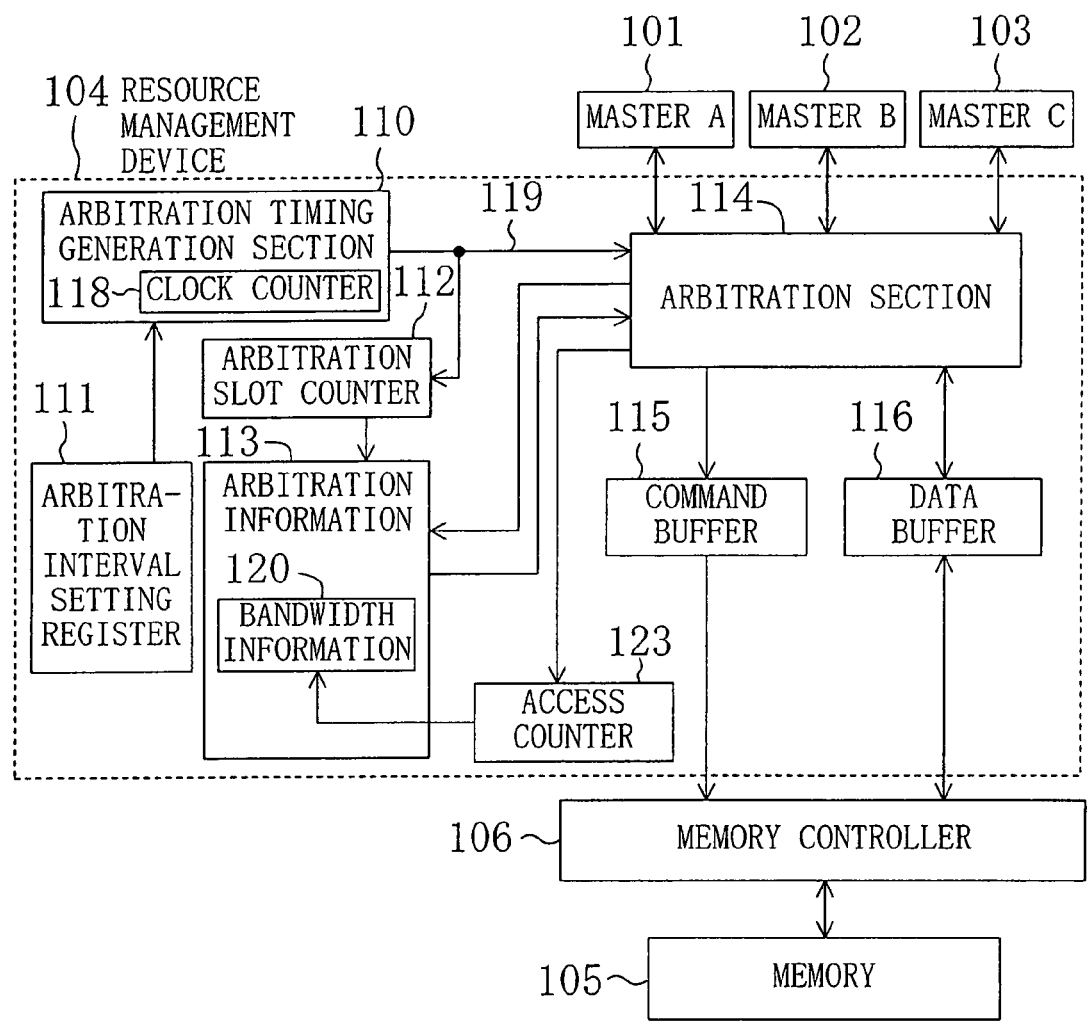
FIG. 15 is a block diagram schematically illustrating the configuration of a data processing system which includes a resource management device according to a fourth embodiment of the present invention.

FIG. 15 schematically illustrates the configuration of a data processing system which includes a resource management device 104 according to a fourth embodiment of the present invention. As in the case of FIG. 11, the difference from FIG. 1 is that the resource management device 104 includes an access counter 123. Arbitration information 113 of FIG. 15 includes bandwidth information 120.

FIG. 16 indicates an example of the bandwidth information 120 shown in FIG. 15. In the bandwidth information 120 in FIG. 16, the first column represents the priority order established among a plurality of masers, where a master of an upper row has a higher priority. In the second column, the initial value of the access counter 123 is set for each master. In the example of FIG. 16, the access counter initial values (i.e., maximum numbers of accesses within one cycle) for the masters A, B and C are set to 2, 4, and 2, respectively.

When an arbitration slot counter 112 has reached a maximum value (8 in this example), the arbitration slot counter 112 is reset to 0, while the access counter initial values for all of the masters in the bandwidth information 120 are established in the access counter 123. For each master, each time its access is granted, the access counter 123 is decremented by one.

Figure 17:
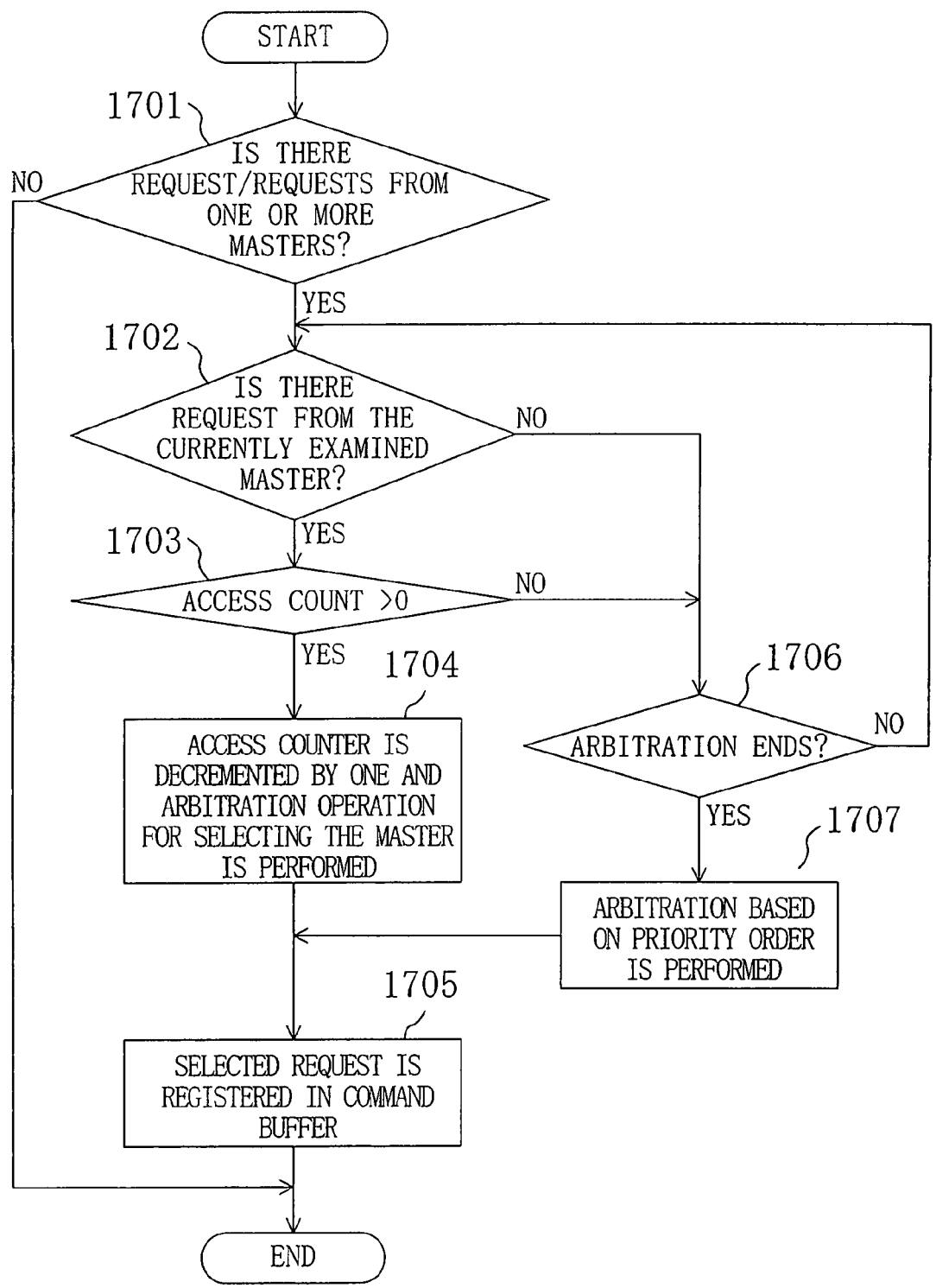
FIG. 17 is a flow chart indicating how an arbitration section shown in FIG. 15 operates.

FIG. 17 indicates how an arbitration section 114 shown in FIG. 15 operates. When an arbitration timing signal 119 has been set, the arbitration section 114 determines whether there is an access request or access requests from one or more of the masters (Step 1701). When there are no requests, the arbitration operation is ended. When there is a request or requests from one or more of the masters, the arbitration section 114 determines, for each of the masters, one by one, whether they have issued a request, in accordance with the priority order established in the first column of the bandwidth information 120 (Step 1702). If the master whose request-issuance is currently examined is found to have issued a request, it is determined whether the value of the access counter 123 for that master is greater than 0 (Step 1703). If the value of the access counter 123 is greater than 0, the value of the access counter 123 for that master is decremented by one and an arbitration operation for selecting that master is performed (Step 1704). Then, the request from that master is registered in a command buffer 115 (Step 1705).

If there is no request from that master in Step 1702 or when the value of the access counter 123 is 0 in Step 1703, it is determined whether there is a master whose priority is lower than that master (Step 1706). If there is a master which requires another arbitration operation, the process returns to Step 1702. If there is no master requiring another arbitration operation, an arbitration operation is performed according to the priority order established in the first column of the bandwidth information 120 (Step 1707). In Step 1707, the arbitration operation is conducted based on the priority order information established in the bandwidth information 120, irrespective of the value of the access counter 123. Even if the value of the access counter 123 for the master that has issued an access request is 0, Step 1707 permits the master with the access request to gain access, so long as there are no access requests from the other masters. Therefore, the usability of the resource does not decrease.

In this embodiment, access requests to the memory 105, i.e., the shared resource, are arbitrated according to the priority order among the masters, and the access counter 123 for limiting the number of accesses to be made by each master within a given period of time is included. Accordingly, it is possible to guarantee, by the setting of the bandwidth information 120, the number of timings of arbitration operations in which the respective masters 101 through 103 have the highest priority for a given time period. Therefore, an access bandwidth is ensured for a master which makes continuous access. Moreover, if the priority level specified for a master in the priority order in the bandwidth information 120 is increased, it becomes possible to reduce the access latency of that master.

It should be noted that the format of the arbitration information 113 is not limited to those described in the foregoing embodiments.

Also, in the foregoing embodiments, the memory 105 has been described as an example of a shared resource. Nevertheless, the present invention is applicable to cases in which not a memory but an input/output device is a shared resource.

Furthermore, although the foregoing embodiments have been described using the three masters 101 through 103 and the single shared resource 105, the present invention is also applicable to complicated data processing systems having four or more masters and a plurality of shared resources.

As described above, the resource management devices of the present invention produce the effects that an access bandwidth is ensured for each master while access latency is reduced in real time, and thus function effectively as data processing systems or the like in which a plurality of masters access a shared resource.

What is claimed is:

1. A resource management device in a data processing system in which a plurality of masters access a shared resource, the resource management device comprising:
   an arbitration timing generation section for generating an arbitration timing signal;
   a bandwidth information module for specifying the number of accesses to be made by each of the masters for a given period of time, each specified number of accesses being used for arbitrating the access conflict;
   an access counter for limiting the number of accesses from each master within the given period of time; and
   an arbitration section for arbitrating the access conflict according to the bandwidth information,
   wherein at each arbitration timing signal generated by the arbitration timing generation section, if there is an access request from any one of the masters, the arbitration section allows the master that has issued the access request to access the shared resource, while limiting, by using the access counter, the number of accesses from each master; and
   the access counter initial values for all of the masters in the bandwidth information module are established in the access counter.

\* \* \* \* \*